March 14, 1967 W. E. SPRINGER ETAL 3,308,610
FLUID APPARATUS FOR REMOVING MIST OR VAPORS FROM THE AIR
Filed March 31, 1964 3 Sheets-Sheet 1

INVENTORS
WILLIAM E. SPRINGER
JERRY V. SHERICK
BY William R. Jacox
ATTORNEY

March 14, 1967 W. E. SPRINGER ETAL 3,308,610
FLUID APPARATUS FOR REMOVING MIST OR VAPORS FROM THE AIR
Filed March 31, 1964 3 Sheets-Sheet 2

INVENTORS
WILLIAM E. SPRINGER
JERRY V. SHERICK
BY William R. Jacox
ATTORNEY

March 14, 1967   W. E. SPRINGER ETAL   3,308,610
FLUID APPARATUS FOR REMOVING MIST OR VAPORS FROM THE AIR
Filed March 31, 1964   3 Sheets-Sheet 3
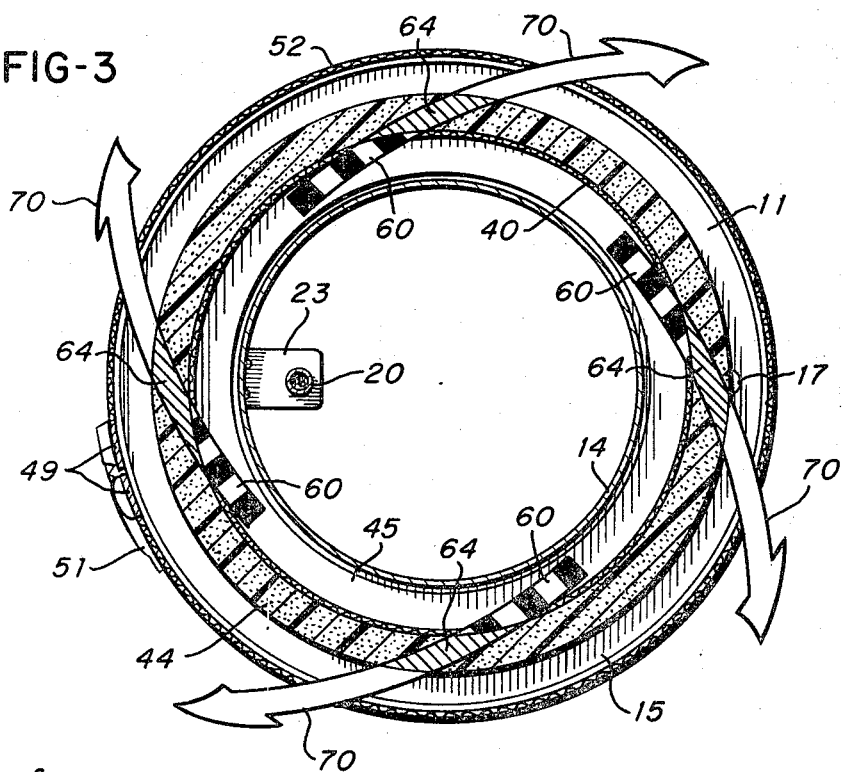
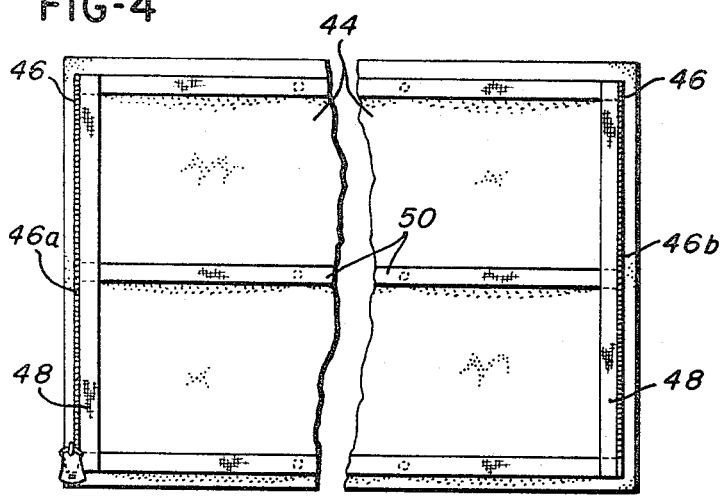
INVENTORS
WILLIAM E. SPRINGER
JERRY V. SHERICK
BY William R. Jacox
ATTORNEY

United States Patent Office

3,308,610
Patented Mar. 14, 1967

3,308,610
FLUID APPARATUS FOR REMOVING MIST OR VAPORS FROM THE AIR
William E. Springer, Springfield, and Jerry V. Sherick, New Carlisle, Ohio, assignors to Robbins & Myers, Inc., Springfield, Ohio, a corporation of Ohio
Filed Mar. 31, 1964, Ser. No. 356,294
3 Claims. (Cl. 55—471)

This invention relates to fluid apparatus.

The invention relates more particularly to apparatus for removing mist or vapors or the like from the air.

In numerous types of industries or the like, mists or vapors occur in the air. These mists or vapors may comprise oil, steam, or other substances.

For example, in many types of industrial processing establishments, such as machine shops or the like, atmospheres therein comprise oil mist laden air. Coolant oils employed in turning or grinding operations or in other machine operations produce a heavy oil mist laden air. It is desirable to control these mists or vapors and/or eliminate the mists or vapors as readily and effectively as possible.

It is an object of this invention to provide apparatus which draws mist laden air thereinto, condenses the mist into liquid, and discharges "cleaned" air therefrom which is free of the material or substance which produced the mist.

Another object of this invention is to provide such apparatus which includes means for collecting the liquid after the liquid is formed therein by condensation of the mist.

Another object of this invention is to provide such apparatus which is capable of treating oil mist laden air or air having one or more of many other types of substances therein in the form of mist or vapor or the like.

Another object of this invention is to provide such apparatus which can be constructed at relatively low costs and which is long-lived.

Another object of this invention is to provide such apparatus which does not require frequent cleaning and which is easily cleaned when necessary.

Other objects and advantages reside in the construction of parts, the combination thereof, the method of manufacture, and the mode of operation, as will become more apparent from the following description.

In the drawings:

FIGURE 3 is a sectional view taken substantially on line 3—3 of FIGURE 2.

FIGURE 4 is a plan view drawn on a smaller scale than the other figures, with parts broken away, of an element of the apparatus of this invention.

Figure 1:
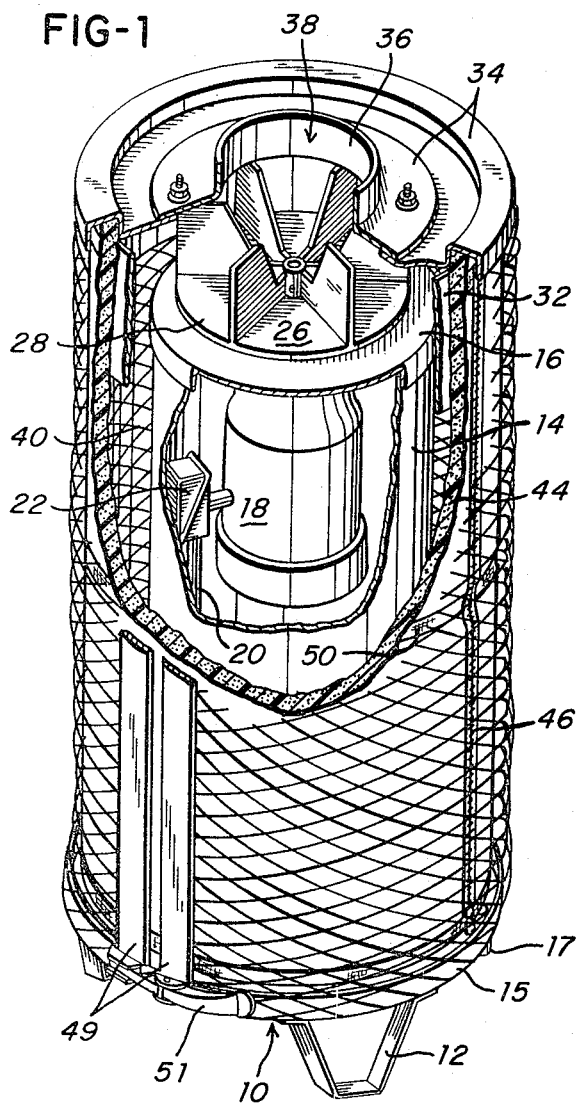
FIGURE 1 is a perspective view, with parts broken away and shown in section, of apparatus of this invention.

Referring to the drawings in detail, apparatus of this invention comprises a base 10, which may be provided with a plurality of legs 12, as shown.

The base 10 supports an inner cylinder 14. The base 10 has a bottom 11 to which is attached an upwardly extending inner annular flange 13 and an outer annular flange 15 so that an annular receptacle is formed. A drain 17 is connected to the receptacle portion of the base 10 for removal of liquid therefrom.

The inner cylinder 14 is elongate, hollow, and rigid and is preferably disposed in an upright manner, as shown, with its central longitudinal axis vertical. A plate or end wall 16 covers the upper end of the cylinder 14 and supports a motor 18 which is disposed within the cylinder 14. The motor 18 is shown as being a machine which is electrically operated. An electrical conduit 20 having a juncture box 22 is adapted to enclose electric conductor members (not shown) which supply electrical energy to the motor 18. A connection box 23 is shown joined to the conduit 20 at the base 10.

Figure 2:
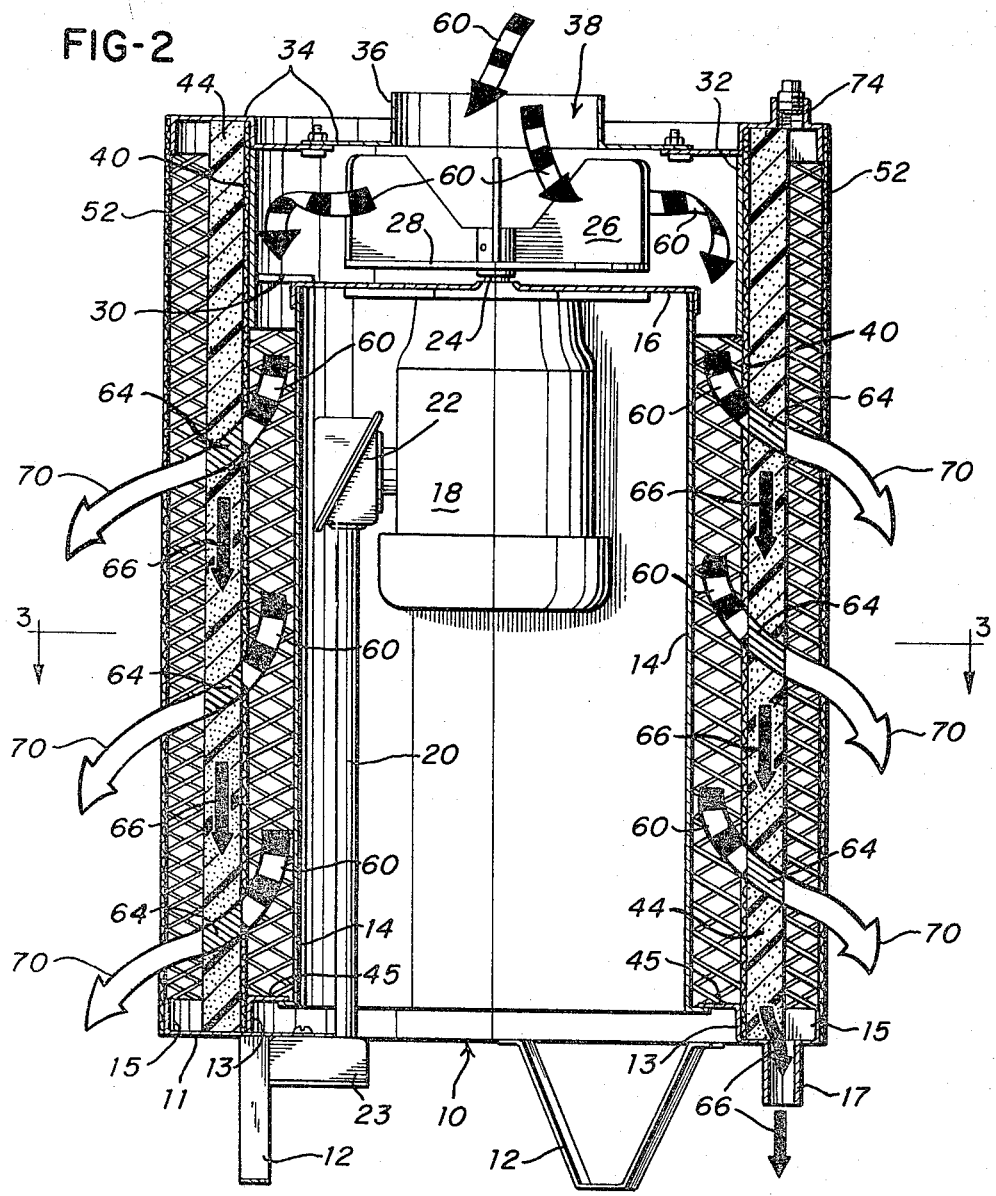
FIGURE 2 is a longitudinal sectional view, drawn on a larger scale, of apparatus of this invention.

The motor 18 has a rotary shaft 24 which extends through the plate 16, as shown in FIGURE 2, and supports a fan or blade wheel 26. The blades of the fan 26 are shown as being radial and are attached to a plate 28 which extends laterally from the shaft 24 for rotation therewith.

One or more brackets 30, shown in FIGURE 2, may be attached to the inner cylinder 14 and the end wall 16 for support of an annular baffle 32 which is spaced from the fan 26. The annular baffle 32 is of solid material such as metal, or plastic, or the like and supports an end plate 34 which has an annular central flange 36 forming an opening 38.

A screen or meshed member 40 has the upper portion thereof closely encompassing the annular baffle 32 for partial support thereby. The screen member 40 is preferably of a type having large area openings in consideration of the size of the area of the material used in formation thereof. The screen member 40 may be expanded metal or the like, if desired. The screen 40 is also partially supported by the base 10 as the screen 40 encompasses the inner cylinder 14 and is spaced therefrom substantially coaxial therewith.

A body or sheet or wall 44 of open pore or porous urethane foam material closely encompasses the screen 40. Material sold by the Scott Paper Company having the trademark Scottfoam has been found to be very satisfactory for use as the body or sheet or wall 44. The sheet 44 may be of any suitable desired thickness and urethane foam material having 60 to 120 pores per linear inch has been found to be very satisfactory.

Preferably, the body or sheet 44 before installation is laid out flat as shown in FIGURE 4. Portions 46a and 46b of a slide fastener 46 are attached to opposite edge portions of the sheet 44 by means of strips of tape 48 or the like. An auxiliary band 50 extends between the opposed edges of the sheet 44 and is attached to the strips of tape 48. Then the sheet 44 is placed around the screen 40 and the slide fastener 46 is used to retain the opposite edge portions of the sheet 40 in juxtaposed relationship as the sheet 44 snugly encompasses the screen 40, as shown in FIGURE 1. The sheet 44 of urethane foam material thus appears as shown in FIGURES 1, 2, and 3 and forms an open pore urethane foam wall which is spaced from the inner cylinder 14. Thus, a fluid passage is formed between the inner cylinder 14 and the urethane wall 44. The base 10 has a horizontal annular flange 45 which closes the bottom end of the passage which is formed between the inner cylinder 14 and the urethane wall 44.

An outer screen 52 is carried by the base 10 and by the end plate 34. The outer screen 52 is spaced from the wall 44 of urethane material and is substantially concentric therewith and may be considered as forming a protective member for the sheet 44 spaced therefrom. The outer screen 52 has opposed end portions attached to strips 49 which are secured in juxtaposed relationship by a clamping member 51 shown in FIGURE 1.

OPERATION

Fluid flows into the apparatus of this invention through the opening 38 in the end plate 34, as shown in FIGURE 2. If desired, the flange 36 which forms the opening 38 may be connected to fluid conduit means, such as a sheet metal pipe or the like (not shown). As the fan 26 is rapidly rotated by the motor 18, fluid is drawn into the apparatus through the opening 38. The apparatus is adapted to receive fluid in the form of mist laden air such as oil mist laden air or the like. In FIGURE 2, arrows referred to by reference numeral 60 illustrate oil mist laden air as it is drawn into the apparatus through the opening 38. The oil mist laden air 60 is forced by the fan 26 to move outwardly aganist the annular baffle 32. Some of the oil mist in the air may liquify into the form of droplets on the baffle 32 as the oil mist laden air engages the annular baffle 32. Such liquified oil then flows downwardly upon the inner surface of the baffle 32 and moves through the screen 40 and into the wall 44 of urethane material.

However, most of the oil mist laden air 60 does not liquify upon the baffle 32. Most of the oil mist laden air 60 moves downwardly into the space or passage between the inner cylinder 14 and the screen 40, as shown in FIGURE 2. The oil mist laden air 60 is forced by action of the fan 26 to move in a somewhat circular path around the inner cylinder 14 and moves through the screen 40 and into the sheet 44 of urethane material in a semi-tangential path, as illustrated by arrows in FIGURE 3.

Each of the arrows shown in FIGURE 3 and each of the large arrows of FIGURE 2 has three portions. The portion 60 illustrates the mist laden air passing through the screen 40 and entering the body 44 of urethane material. The portion 64 of each arrow illustrates the fluid within the body 44 of urethane material, and a portion 70 of each arrow illustrates the air as it flows out of the urethane material 44.

As the oil mist laden air 60 is forced into the wall or sheet 44 of open pore urethane material, the oil mist, referred to by reference numeral 64 in FIGURES 2 and 3, strikes numerous strands of the urethane foam material within the body 44 thereof and condenses, forming liquid oil within the sheet 44 of urethane material.

The air within which the oil mist was carried continues to pass through the wall 44 of urethane material and moves therefrom leaving the oil particles within the sheet or wall 44. This clean air, as it moves from the wall 44, is illustrated by reference numerals 70 in FIGURES 2 and 3. The clean air 70 then moves outwardly from the apparatus through the outer screen 52, as shown in FIGURES 2 and 3.

The liquid oil which is formed within the wall 44 by condensation of the oil mist is referred to by numeral 66 and flows downwardly through the pores of the sheet 40 of urethane material, as shown in FIGURE 2. As stated above, the base 10 with the flanges 13 and 15 thereof forms a receptacle into which the liquid oil 66 flows from the body 44 of urethane material. The liquid oil 66 is then drained from the base 10 through the drain member 17, as shown in FIGURE 2.

If desired, the apparatus of this invention may be inverted so that the opening 38 is downwardly. In such event the liquid oil which is condensed from the air flows to the end plate 34 and is drained from the apparatus through a drain member 74, shown in FIGURE 2.

It is to be understood that the apparatus of this invention is adapted to receive any air which carries a mist or the like for condensing the mist from the air.

Thus, it is understood that the apparatus of this invention draws mist laden air or the like thereinto, removes the mist from the air, and cleaned air, free of the mist, flows from the apparatus. The liquid condensed from the air within the apparatus is drained therefrom as desired.

Any dust particles or the like which may be in the oil mist laden air which is drawn into the apparatus are retained in the sheet or wall 44. This may result in the necessity for infrequent cleaning of the sheet 44 of urethane material. When such cleaning is necessary, the outer screen 52 is removed by release of the clamping member 51 and then the sheet 44 of urethane material is removed by opening the slide fastener 46. The sheet 44 is then easily cleaned by washing in any suitable manner.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Oil mist collector apparatus comprising:
   a rigid solid inner cylinder closed at least at one end thereof,
   rotary motor means within the inner cylinder and having a rotary shaft extending through the closed end thereof,
   a fan member attached to the shaft for rotation therewith exterior of the cylinder,
   an annular baffle encompassing the fan member and spaced therefrom,
   an annular screen encompassing the inner cylinder and spaced therefrom and coaxial therewith,
   a body of open pore urethane material encompassing the screen adjacent thereto,
   there being an inlet passage adjacent the fan member for flow of oil mist laden air to the fan member, the fan member drawing oil mist laden air through the opening and forcing the oil mist laden air outwardly therefrom toward the baffle, the oil mist laden air flowing between the inner cylinder and the screen and flowing through the screen and into the body of urethane material, the air flowing through the urethane material and leaving the oil mist within the urethane material as the oil mist is condensed within the urethane material.

2. Apparatus for removing oil mist from air having oil mist therein comprising:
   a base in the form of a liquid receptacle,
   an inner hollow cylinder supported by the base and substantially normal thereto,
   a closure member covering the cylinder at the end thereof opposite the base,
   a motor within the hollow cylinder, the motor having a rotary shaft extending through the closure member,
   a fan attached to the rotary shaft exterior of the inner cylinder,
   a wall of open pore urethaen foam material encompassing the fan and the inner cylinder and spaced therefrom so that a passage is formed between the inner cylinder and the wall,
   the fan forcing air having oil mist therein into the wall of urethane foam material, the air passing through the wall while the oil mist condenses into liquid oil within the wall, the liquid oil flowing within the wall to the base.

3. Oil mist collector apparatus comprising:
   an elongate hollow cylinder of solid material closed at one end thereof,
   a fan member adjacent the closed end of the cylinder and rotatable about an axis which is substantially coaxial therewith,
   motor means attached to the fan member for rotation thereof,
   a baffle encompassing the fan and the closed end of the cylinder and spaced therefrom and coaxial therewith,
   a body of open pore urethane material in juxtaposition with the baffle and coaxial therewith, the body of open pore urethane material encompassing the cylinder and spaced therefrom substantially coaxial therewith, the body of urethane material extending substantially the length of the cylinder so that a passage is formed between the cylinder and the body of open pore urethane material along the length of the cylinder, means forming an inlet opening adjacent the fan, the motor means rotating the fan to draw oil mist laden air through the inlet opening, the fan member forcing the oil mist laden air outwardly therefrom toward the baffle, the baffle directing the oil mist laden air into the passage which exists between the cylinder and the body of open pore urethane material, the oil mist laden air flowing within the passage formed between the cylinder and the body of open pore urethane material, the oil mist laden air flowing into the body of urethane material, the air flowing through the urethane material and leaving the oil mist within the urethane material as the oil mist is condensed within the urethane material.

References Cited by the Examiner
UNITED STATES PATENTS

| | | | |
|---|---|---|---|
| 2,019,525 | 11/1935 | Dooley | 55—242 X |
| 2,745,513 | 5/1956 | Massey | 55—317 X |
| 2,889,007 | 6/1959 | Lunde | 55—317 |
| 2,970,671 | 2/1961 | Warner | 55—242 |
| 3,006,437 | 10/1961 | Lowther | 55—97 |
| 3,016,984 | 1/1962 | Getzin | 55—500 X |
| 3,190,057 | 6/1965 | Sinex | 55—313 |

REUBEN FRIEDMAN, *Primary Examiner.*

J. ADEE, *Assistant Examiner.*